United States Patent
Chen

(10) Patent No.: US 8,453,013 B1
(45) Date of Patent: May 28, 2013

(54) SYSTEM-HANG RECOVERY MECHANISMS FOR DISTRIBUTED SYSTEMS

(75) Inventor: Jun Chen, Sunnyvale, CA (US)

(73) Assignee: Google Inc, Mountain View, CA (US)

( * ) Notice: Subject to any disclaimer, the term of this patent is extended or adjusted under 35 U.S.C. 154(b) by 121 days.

(21) Appl. No.: 12/169,691

(22) Filed: Jul. 9, 2008

(51) Int. Cl.
*G06F 11/00* (2006.01)

(52) U.S. Cl.
USPC .............................................. 714/15; 714/13

(58) Field of Classification Search
USPC ........................................................... 714/15
See application file for complete search history.

(56) References Cited

U.S. PATENT DOCUMENTS

| | | | | |
|---|---|---|---|---|
| 5,630,067 A * | 5/1997 | Kindell et al. | ................ | 709/231 |
| 5,717,688 A * | 2/1998 | Belanger et al. | ............. | 370/331 |
| 5,721,918 A * | 2/1998 | Nilsson et al. | ........................ | 1/1 |
| 5,978,911 A * | 11/1999 | Knox et al. | ........................ | 713/1 |
| 6,330,528 B1 * | 12/2001 | Huang et al. | .................... | 703/22 |
| 6,633,835 B1 * | 10/2003 | Moran et al. | ................. | 702/190 |
| 6,745,321 B1 * | 6/2004 | Floyd et al. | ................... | 712/227 |
| 6,816,899 B1 * | 11/2004 | Meah | ............................ | 709/225 |
| 6,983,363 B2 * | 1/2006 | Coffey | ............................... | 713/1 |
| 7,000,100 B2 * | 2/2006 | Lacombe et al. | ................. | 713/1 |
| 7,134,046 B2 * | 11/2006 | Rathunde et al. | .............. | 714/10 |
| 7,343,476 B2 * | 3/2008 | Floyd et al. | ................... | 712/216 |
| 7,401,112 B1 * | 7/2008 | Matz et al. | .................... | 709/202 |
| 7,627,782 B2 * | 12/2009 | Kitajima | ........................ | 714/13 |
| 7,681,075 B2 * | 3/2010 | Havemose et al. | ............. | 714/15 |
| 7,725,685 B2 * | 5/2010 | Floyd et al. | .................... | 712/216 |
| 7,900,096 B2 * | 3/2011 | Cardwell et al. | ................ | 714/56 |
| 8,108,722 B1 * | 1/2012 | Havemose et al. | ............. | 714/15 |
| 2004/0119639 A1 * | 6/2004 | Gilkes | ...................... | 342/357.15 |
| 2004/0143648 A1 * | 7/2004 | Koning et al. | ................ | 709/219 |
| 2005/0078032 A1 * | 4/2005 | Gilkes | ...................... | 342/357.15 |
| 2005/0273645 A1 * | 12/2005 | Satran et al. | ....................... | 714/4 |
| 2005/0283676 A1 * | 12/2005 | Begg et al. | ....................... | 714/38 |
| 2007/0260733 A1 * | 11/2007 | Havemose et al. | ........... | 709/226 |
| 2008/0141000 A1 * | 6/2008 | Floyd et al. | .................... | 712/216 |
| 2009/0271794 A1 * | 10/2009 | Zoll et al. | ....................... | 718/103 |
| 2010/0088678 A1 * | 4/2010 | AlTurki et al. | ................ | 717/124 |
| 2010/0318637 A1 * | 12/2010 | Ly et al. | ......................... | 709/221 |
| 2011/0238777 A1 * | 9/2011 | Ignatius et al. | ............... | 709/213 |

* cited by examiner

*Primary Examiner* — Kamini Patel
(74) *Attorney, Agent, or Firm* — Mollborn Patents, Inc.; Fredrik Mollborn

(57) ABSTRACT

Methods and apparatus, including computer program products, implementing and using techniques for resolving a hang condition in a distributed environment including a client computer and server computer(s). A network thread is provided, which passes requests from the client computer to the one or more server computers and responses from the server computers to the client computer. Worker thread(s) are provided on the server computers. The worker threads receive requests from the network thread, execute the requests, and pass responses to the requests back to the network thread. A request is sent from the client computer to a server computer through the network thread. A timer associated with the request is started on the client computer. The timer specifies a pre-defined time period for receiving a response to the request. When no response has been received within the pre-defined time period, a reset request is sent to the server computer.

16 Claims, 2 Drawing Sheets

SYSTEM-HANG RECOVERY MECHANISMS FOR DISTRIBUTED SYSTEMS

BACKGROUND

This invention relates to distributed computer systems. A common concern for computer system manufacturers, computer component manufacturers, and computer users is to detect and recover from computer system malfunctions. The malfunctions may arise from a range of causes, such as memory data corruption, data corruption related to fixed disks or removable media, operating system errors, component errors, components overheating, applications or operating systems performing illegal instructions with respect to the processor, incompatibility between various hardware and software system components, and so on.

One class of malfunction is referred to as system "hangs." A system is "hanged" when the system is no longer able to make progress. Some malfunctions that can result in system hangs include operating systems or hardware components entering an unknown state and not being able to leave that state, causing the operating system or hardware component to cease normal operation. In these cases, the user must restart the computer. Restarting the computer after a system hang can cause problems such as data loss and corruption.

Conventionally, system hangs are detected using timers known as "watchdog" timers. In a typical watchdog timer implementation, a processor periodically resets the timer, and under normal operation the timer never reaches a certain value (or counts down to zero from a certain value). If the timer reaches the certain value, this is an indication that a system hang condition has occurred and the computer system is reset.

In a distributed system, however, application instances running on different machines need to be able to coordinate with each other, such as responding to requests from other machines. If an application in one computer hangs, the application will fail to respond to requests from other computers. As a result, applications running on the other computers may wait forever for the response. Thus, a system-hang in one machine may trigger chain reaction causing the whole distributed system to hang.

A client-server model is common in a distributed system. In the client-server model, a server waits for a request from a client. After a client has sent a request to the server, the client waits for the response to the request from the server. That is, both the client and the server must block itself to wait for external events. Introducing watchdog timers to each client and server in a distributed system would make the system very complex, as the client and servers must periodically wake up from their waiting states in order to periodically reset the watchdog timers in order to prevent the watchdog timers from resetting the respective computers.

SUMMARY

In general, in one aspect, the various embodiments provide methods and apparatus, including computer program products, implementing and using techniques for resolving a hang condition in a distributed environment including a client computer and one or more server computers. A network thread is provided. The network thread passes requests from the client computer to the one or more server computers and passes responses from the one or more server computers to the client computer. One or more worker threads are provided on the one or more server computers. The worker threads receive requests from the network thread, execute the requests, and pass responses to the requests back to the network thread. A request is sent from the client computer to a server computer through the network thread. A timer associated with the request is started on the client computer. The timer specifies a pre-defined time period during which a response to the request must be received. When no response has been received within the pre-defined time period, a reset request is sent to the server computer.

Implementations can include one or more of the following features. The reset request can be sent to the server computer through the network thread. The reset request can be sent to the server computer through a reset thread. The one or more server computers might not contain any watchdog timers associated with the request. The reset request can include a request to reboot the operating system and application on the server, a request to reset the application associated with the worker thread processing the request, or a request to reset the worker thread processing the request. The timer associated with the request can be a hardware implemented timer or a software implemented timer.

A dedicated reboot thread on the one or more server computers can listen for reboot messages sent by the client computer. The network thread can perform system health monitoring tasks or general system timer tasks. The pre-defined time period can be configurable by a system administrator. The pre-defined time period can be based on a network delay, a computation delay, a current worker thread load, the type of request, or a user-supplied value.

Various implementations can include one or more of the following advantages. Distributed systems can recover automatically from system hangs without the intervention of a computer system administrator. Separate watchdog timers are not needed on each individual computer in the system. Different time periods can be defined that specify when a system is considered to be hanging.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
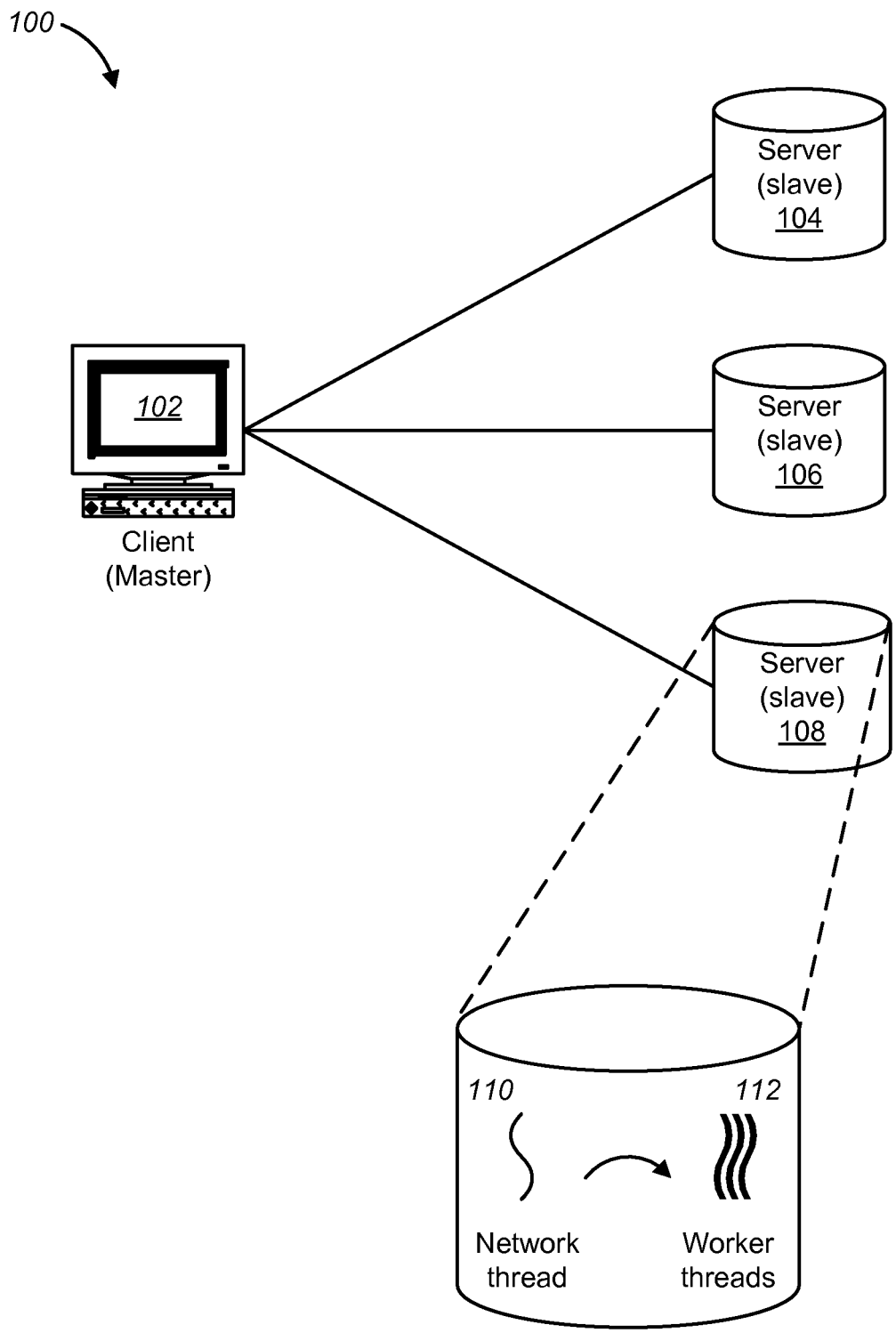
FIG. 1 shows a schematic overview of a distributed computer system environment in accordance with one embodiment of the invention.

As shown in FIG. 1, a distributed system (100) in accordance with one embodiment of the invention includes a client computer system (102), referred to below as a "client" and a number of servers (104, 106, 108). It should be noted that typically a large number of clients and servers form the system, depending on the system requirements. In FIG. 1, however, only a single client (102) and three servers (104, 106, 108) are shown for ease of explanation. In typical operation, the client (102) sends requests to the servers (104, 106, 108), the servers (104, 106, 108) process the request, and return the result of the processing as a response to the client (102). The mechanisms for sending requests and receiving responses are well known to those of ordinary skill in the art, and will therefore not be described here in any further detail.

The lower part of FIG. 1 shows an enlarged schematic view of one of the servers (108) in accordance with one embodiment of the invention. The other servers (104, 106) shown in FIG. 1 operate in a similar manner. As can be seen, during typical operation, the server (108) runs two main types of threads of execution: a network thread (110) and one or more worker threads (112). As is well known to those of ordinary skill in the art, threads can generally be described as a way for a program to fork (i.e., split) itself into two or more simultaneously running tasks that can execute independently of each other. Both the client (102) and the servers (104, 106, 108) in FIG. 1 are implemented to support multithreading, that is, to support application programs whose threaded parts can execute concurrently. The servers might also be running multiple application programs concurrently, where each application program has multithreaded parts that can execute concurrently.

The network thread (110) is designed to be robust and simple. In one embodiment, the only task of the network thread (110) is to wait for requests from the client (102), to pass the requests to the worker threads (112), to wait for responses from the worker threads (112) and to pass these responses back to the client (102). The worker threads (112) are designed to receive the requests from the network thread (110), perform the computation work, and pass the responses back to the network thread (110).

Figure 2:
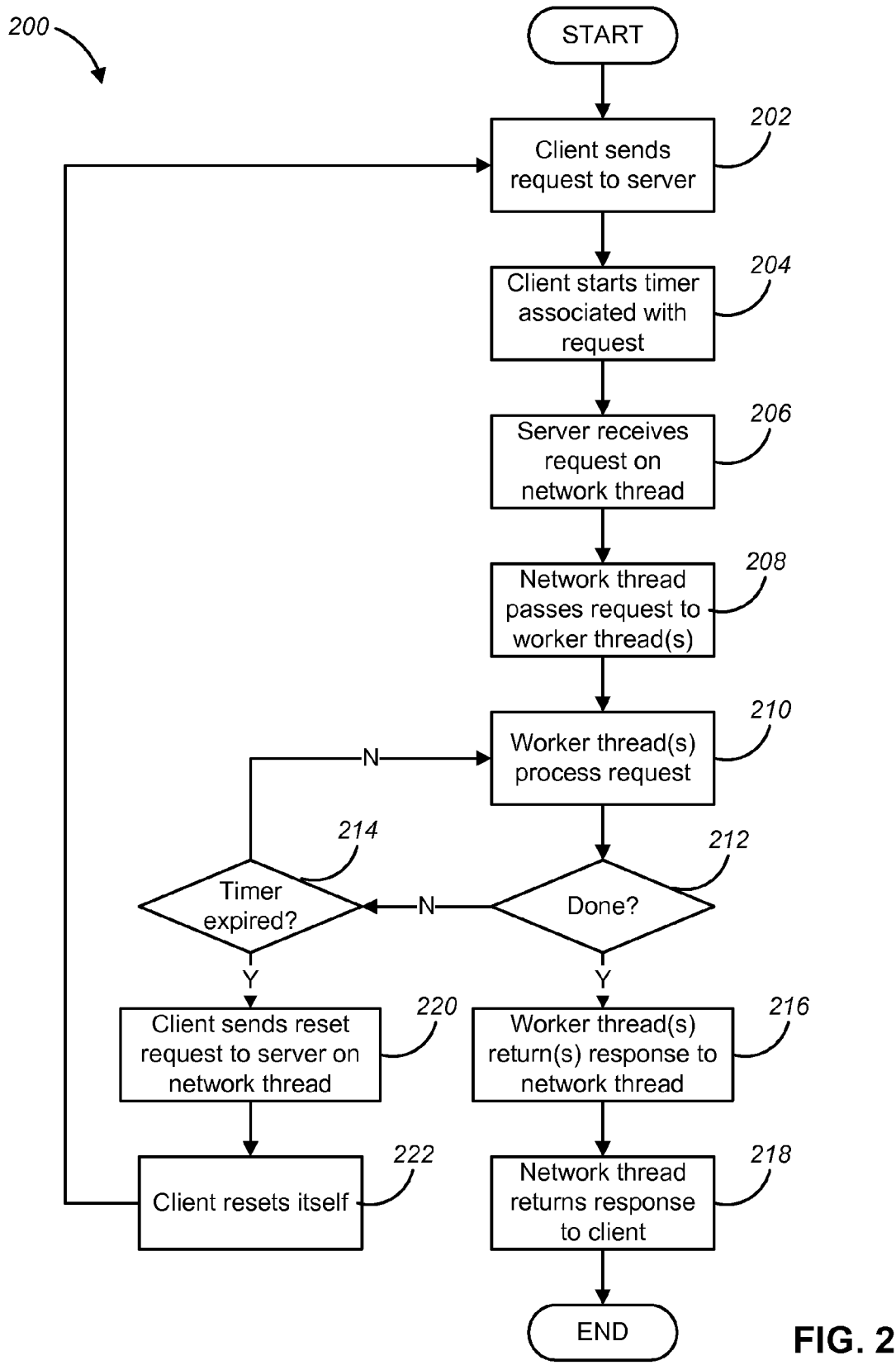
FIG. 2 is a flowchart showing a process for a system-hang detection and recovery mechanism in accordance with one embodiment of the invention.

The network thread (110) is designed to be simple and robust, since the network thread (110) only receives requests from the client (102) and dispatches the requests to the worker threads on the server (104, 106, 108), thereby causing the network thread to be less error prone compared to other threads. The network thread (110) will thus essentially never experience a hang situation. On the other hand, the worker threads (112) that perform the actual computational operations, may be more likely to hang. By having the non-hanging network thread (110), it is possible to include watchdog functionality for the servers on the client (102), rather than having individual watchdog timers on each server (104, 106, 108). In one implementation, when the client (102) sends a request to a server (104, 106, 108), the client (102) sets a timeout value during which a response to the request must be received. If no response is received from the server (104, 106, 108) within the specified time, the client (102) knows that it is likely that one or more of the worker threads (112) has hung, and proceeds with sending a reset request to the server (104, 106, 108) through the network thread. When the network thread of server (104, 106, 108) receives the request, the network thread reboots the server (104, 106, 108) which thus recovers from the system-hang condition. This process will now be described in further detail with reference to FIG. 2, which shows a flowchart of a process for a system-hang detection and recovery mechanism in accordance with one embodiment of the invention As can be seen in FIG. 2, the process (200) starts with the client (102) sending a request to one of the servers (104, 106, 108) (step 202). The request can be, for example, a request to fetch a file stored in the server (104, 106, 108). The client (102) then starts a timer that is associated with the request (step 204). The timer can be implemented in software or hardware and specifies a time by which a response to the request must be received by the client (102). The specified time can be a fixed number set by a system administrator, or can vary based on different factors, such as network delay and/or computation delay, as some requests are known beforehand to take a longer time to fulfill. The specified time can also be varied based on measured network and computer system conditions, for example, a current system load, which affects how fast a task can make progress within the system. When a static value is used, it can generally be set relatively high, for example, at about 10 seconds, as this is a relatively long time for a request to be fulfilled in many systems (that is, a system hang condition is very likely if the timer expires), whereas 10 seconds is a relatively short time in terms of performing system recovery operations. The particular time chosen will depend on the particular system being used.

Next, the server (104, 106, 108) receives the request on the network thread (110) (step 206) and passes the received request to one or more of the worker threads (112) (step 208). The communication between the network thread (110) and the worker threads (112) can be performed using standard multithreading mechanisms, such as message queues, which are well known to those of ordinary skill in the art.

The number of active worker threads can be decided, at least in part, based on the system workload. For example, if it is necessary to access a disk drive as part of fulfilling a request, which can be a slow operation (that is, a high-latency job), it may be desirable to add one or more new worker threads, so that other operations are not blocked by the comparatively slow disk access operation of the busy worker thread.

Next, the process enters a loop, where the client (102) waits for a response from the server (104, 106, 108) (step 212), while ensuring that the timer has not expired (step 214). If the client (102) receives a response from the worker threads (112) to the request before the timer expires, the worker threads (112) return the response to the network thread (110) (step 216). Finally, the network thread (110) returns the response to the client (102) (step 218), which completes the process.

If it is detected in step 214 that the timer has expired, the client (102) assumes that some kind of system-hang condition has occurred with one or more of the worker threads (112) in the server (104, 106, 108), and sends a reset request to the corresponding server through the network thread (110) on the corresponding server (step 220). Again, as was described above, the network thread (110) is designed to be robust and simple, so even if the worker threads (112) hang, the network thread (110) will continue to operate. The reset request causes the server (104, 106, 108) to reset itself (step 222), and once the reset is complete, the process returns to step 202 where the client (102) can send out the same request to the server (104, 106, 108). It should be noted that if a servers, e.g, server A, can send requests to yet another server, e.g, server B. In this case, server A becomes the client for server B, and the same mechanisms that were described above apply to servers A and B in their new roles as "client A" and "server B."

The reset request in step 220 can be made at different levels. For example, in some embodiments, the application running the worker threads (112) can be reset, in other embodiments, the entire server operating system can be reset, and in yet other embodiments only the specific worker threads (112) themselves that experience a hang situation can be reset.

Various embodiments of the invention can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Various embodiments of the invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the various embodiments of the invention can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the various embodiments of the present invention employ various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered however, that all of these and similar terms are to be associated with the appropriate physical quantities and are merely convenient labels applied to these quantities.

The various embodiments of the present invention also relate to a device, system or apparatus for performing the aforementioned operations. The system may be specially constructed for the required purposes, or it may be a general-purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

A number of implementations have been described. Nevertheless, it will be understood that various modifications may be made. For example, instead of sending the reboot request on the network thread, the servers could have a dedicated "reboot thread," whose only task is to listen to reboot requests from the client. That is, the client sends reboot requests directly to the reboot thread instead of through the network thread, and the reboot thread will reboot the system in response to receiving such a request. The network thread could also reset the system if the network thread does not receive response from a worker thread within a certain time. The network thread can also be made more complex in order to handle other tasks, such as system health monitoring tasks, running a system timer for scheduling work that is to be done at a specific later point in time, and so on. Accordingly, other embodiments are within the scope of the following claims.

The invention claimed is:

1. A method for resolving a hang condition in a distributed computing environment including a client computer and two or more server computers, comprising:
   providing a network thread on each of the two or more server computers, each network thread being operable to pass requests from the client computer to the server computer on which the network thread is provided and to pass responses from the server computer on which the network thread is provided to the client computer;
   providing one or more worker threads on each of the two or more server computers, the worker threads being operable to receive requests from the network thread on the server computer where the one or more worker threads reside, execute the requests, and pass responses to the requests back to the network thread;
   sending two or more requests from the client computer to two or more server computers among the server computers through the respective network threads;
   starting two or more timers on the client computer, each timer being associated with a request sent to a server computer, each timer specifying a pre-defined time period during which a response to the request must be received; and
   when no response has been received within the pre-defined time period for a timer, sending a reset request to the server computer associated with the timer through one or more of: the network thread provided on the server computer and a reset thread provided on the server computer.

2. The method of claim 1, wherein the one or more server computers do not contain any watchdog timers associated with the request.

3. The method of claim 1, wherein the reset request includes one of: a request to reboot the operating system and application on the server, a request to reset the application associated with the worker thread processing the request, and a request to reset the worker thread processing the request.

4. The method of claim 1, wherein the timer associated with the request is one of: a hardware implemented timer and a software implemented timer.

5. The method of claim 1, further comprising:
providing a dedicated reboot thread on each of the two or more server computers; and
listening for reboot messages sent by the client computer using the dedicated reboot threads.

6. The method of claim 1, wherein each network thread is further operable to perform one or more of: system health monitoring tasks, general system timer tasks.

7. The method of claim 1, wherein the pre-defined time period is configurable by a system administrator.

8. The method of claim 1, wherein the pre-defined time period is based on one or more of: a network delay, a computation delay, a current worker thread load, the type of request, and a user-supplied value.

9. A computer program product, stored on a non-transitory machine-readable storage medium, for resolving a hang condition in a distributed computing environment including a client computer and one or more server computers, comprising instructions operable to cause a computer to:
provide a network thread on each of the two or more server computers, each network thread being operable to pass requests from the client computer to the server computer on which the network thread is provided and to pass responses from the server computer on which the network thread is provided to the client computer;
provide one or more worker threads on each of the two or more server computers, the worker threads being operable to receive requests from the network thread on the server computer where the one or more worker threads reside, execute the requests, and pass responses to the requests back to the network thread;
send two or more requests from the client computer to two or more server computers among the server computers through the respective network threads;
start two or more timers on the client computer, each timer being associated with a request sent to a server computer, each timer specifying a pre-defined time period during which a response to the request must be received; and
when no response has been received within the pre-defined time period for a timer, send a reset request to the server computer associated with the timer through one or more of: the network thread provided on the server computer and a reset thread provided on the server computer.

10. The computer program product of claim 9, wherein the one or more server computers do not contain any watchdog timers associated with the request.

11. The computer program product of claim 9, wherein the reset request includes one of: a request to reboot the operating system and application on the server, a request to reset the application associated with the worker thread processing the request, and a request to reset the worker thread processing the request.

12. The computer program product of claim 9, wherein the timer associated with the request is one of: a hardware implemented timer and a software implemented timer.

13. The computer program product of claim 9, further comprising instructions operable to cause the computer to:
provide a dedicated reboot thread on each of the two or more server computers; and
listen for reboot messages sent by the client computer using the dedicated reboot threads.

14. The computer program product of claim 9, wherein each network thread is further operable to perform one or more of: system health monitoring tasks, general system timer tasks.

15. The computer program product of claim 9, wherein the pre-defined time period is configurable by a system administrator.

16. The computer program product of claim 9, wherein the pre-defined time period is based on one or more of: a network delay, a computation delay, a current worker thread load, the type of request, and a user-supplied value.

* * * * *